O. KONIGSLOW.
CONNECTING ROD.
APPLICATION FILED DEC. 13, 1917.
1,291,929.
Patented Jan. 21, 1919.
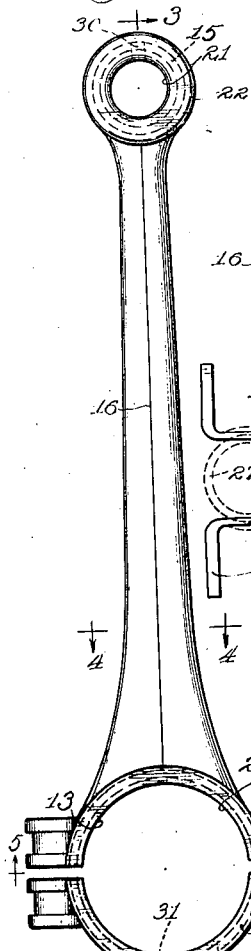
Fig. 1
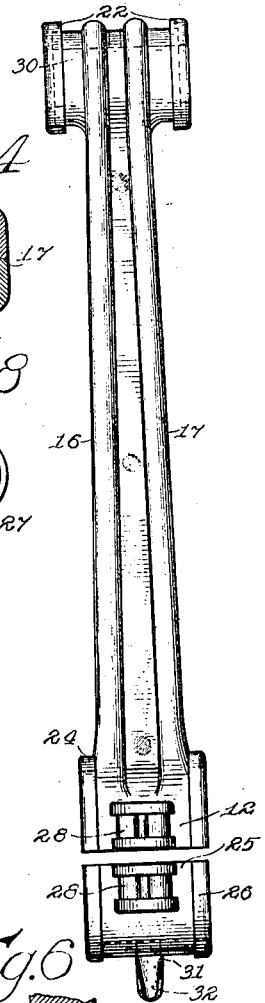
Fig. 2
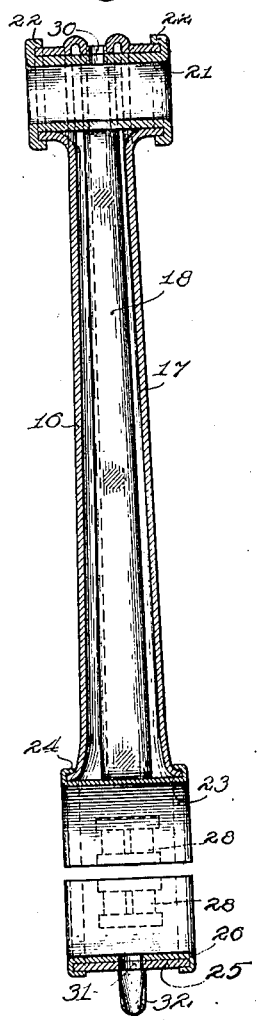
Fig. 3
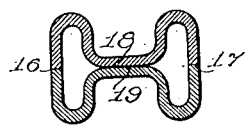
Fig. 4
Fig. 8
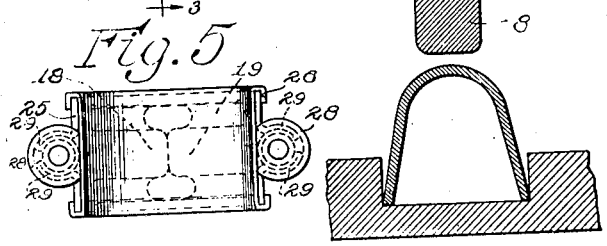
Fig. 5
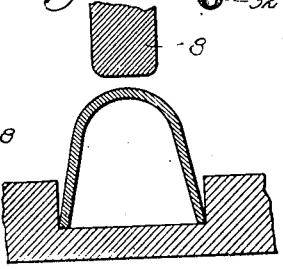
Fig. 6
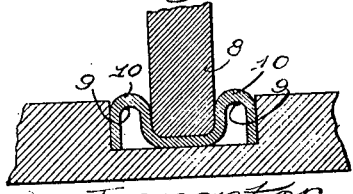
Fig. 7
Witnesses:
Andrew Hintercorn
Albin C Ahlberg
Inventor
Otto Konigslow
By Williams, Bradbury &c
Attorneys

UNITED STATES PATENT OFFICE.

OTTO KONIGSLOW, OF CLEVELAND, OHIO, ASSIGNOR TO THE OTTO KONIGSLOW MANUFACTURING COMPANY, OF CLEVELAND, OHIO, A CORPORATION OF OHIO.

CONNECTING-ROD.

1,291,929.   Specification of Letters Patent.   Patented Jan. 21, 1919.

Application filed December 13, 1917. Serial No. 206,912.

*To all whom it may concern:*

Be it known that I, OTTO KONIGSLOW, a citizen of the United States, residing at Cleveland, in the county of Cuyahoga and State of Ohio, have invented a certain new and useful Improvement in Connecting-Rods, of which the following is a full, clear, concise, and exact description, reference being had to the accompanying drawings, forming a part of this specification.

My invention relates to connecting rods for engines. It relates more particularly to a pressed metal connecting rod wherein the metal, although thin in crossed section, is so disposed as to adequately meet the stress imposed upon it when operated with internal combustion engines of the modern high speed type. The object of the invention is to dispose the metal of a pressed metal arm in such position as to provide a light but at the same time extremely strong rod. This is accomplished by the elimination of all exposed raw metal edges, and by thickening and setting the metal in the regions which come under the greatest tension and compression during the operation of the engine.

My invention also relates to the construction of the bearing portions of the connecting rod, this construction providing a means for strengthening the end portions, for providing an internally cylindrical surface for receiving the bearing sleeves and for aiding in holding the two halves of the rod together. My invention further relates to the method of forming the rod halves which causes the thickening of the metal at the proper points instead of the stretching of the metal, as would occur from the use of the ordinary method of deformation.

My invention is illustrated in the accompanying drawing, in which—

Figure 1 is an axial view of the rod;
Fig. 2 is a side view thereof;
Fig. 3 is a section taken on the line 3—3 of Fig. 1;
Fig. 4 is a section taken on the line 4—4 of Fig. 1;
Fig. 5 is a view taken on the line 5—5 of Fig. 1 in the direction of the arrow;
Fig. 6 illustrates a section of the arm in the process of construction, taken on the line 4—4 of Fig. 1, after it has been formed into a substantial U cross section;
Fig. 7 illustrates the method of forming the rod into its final shape, which results in the thickening of the portions of the metal which come under the greatest strain through the whipping action of the rod; and
Fig. 8 illustrates several steps in the method of forming the means for securing the two halves of the lower bearing together.

In carrying out my invention a blank is made which is substantially twice the length of the completed arm, and which is of the proper width throughout to furnish metal for the desired conformation. The blank is then formed first into a substantial U shape, such as illustrated in Fig. 6, and then into the form illustrated in Fig. 7, this latter being accomplished by a gradual rolling operation brought about by the depression of the plunger 8. This operation differs from the usual drawing operation in that there is no support for the under side 9 of the folds which are formed on each side of the plunger 8, and by the fact that the external surfaces 10 of the said folds are not struck by a die in the usual manner. Preferably by the same operation the end portions 12 and 13 of the two halves of the arm are formed into the shape illustrated. The two halves of the arm are now bent around an arbor of the proper size to form the upper sleeve 15, this operation being one which can be performed readily by hand. It is to be understood that the two halves may be made of separate pieces of metal, in which case the upper part 15 would be formed into a semi-cylindrical shape in the same operation as that above described. When the two halves are brought together, whether they were originally in one piece or in two pieces, the edges illustrated in section at 16 and 17 of Figs. 3 and 4 register through the length of the arm, and the faces of the central portions 18 and 19 also register throughout the length of the rod. The two halves of the rod are now united throughout their length by spot welding the registering webs 18 and 19 and by welding the registering edges 16 and 17, preferably by use of the oxy-acetylene flame. The sleeve 21 is then inserted through the upper portion of the connecting rod and its ends are pressed or spun over as shown at 22, so that the part 15 is rigidly reinforced throughout and the two halves are bound together by the overlapping ends of the sleeve 21. The sleeve 21 may thereafter be reamed so as to have a perfect cylindrical bore either for receiving an additional bearing piece or for actual bearing surface on the wrist pin. The lower ends of the piston rod halves are bound together by a similar method, the reinforcing metal, however, being in the form of a semi-cylindrical part 23 having edges 24 pressed or spun over the halves of the rod to reinforce as well as to bind the two halves together.

The lower bearing cylinder is completed by means of a pressed cap 25, which is likewise reinforced by a semi-cylindrical part 26 spun over in the same manner as are the parts 21 and 23. At the time the blank is given its U shape loops 27 (see Fig. 8) are formed at the extreme ends of the blanks and extend outwardly therefrom. The bights of these loops are then forced inwardly until their inner sides lie substantially in the planes of the inner sides of the lower bearing cylinder. The two ply projections thus formed are circularly conformed, as indicated in dotted lines in Figs. 5 and 8. The bights of the loops form circular webs 27' which connect the inner ends of the inner plies. A seamless tubular bushing 28 is then inserted between each pair of curved projections 29 and the ends spun over the ends of the projections 29, as shown in Figs. 1, 2 and 3. The inner edges of the ends of the bushings lie flush with the plane of the inner sides of the bearing cylinder. The bores of the bushing 28 are to receive bolts for holding the halves of the bearing housing together, the cap 25 being provided with bushings secured thereto by a construction similar to that just described. The construction is such that extreme strength is secured through the assistance of the braces which form the sides of the struck up projections 29.

Suitable oil holes 30 and 31 are provided, the latter being also provided with an oil scoop 32 for directing the oil into the bearing.

Connecting rods made according to my invention have the distinct advantage over cast or drop forged arms that they may be produced in uniform weight without any milling or filing operation such as is almost universally necessary in balancing the arms made by the usual drop forging or casting processes.

While I have described my invention with respect to the details illustrated in the accompanying drawing, it is to be understood that certain modifications may be made therefrom without departing from the spirit or scope of my invention.

What I claim is:

1. A connecting rod of pressed metal formed of two halves, the dividing line of which lies in the plane of the engine crank shaft and in which the edges of the metal forming the halves are welded together, and in which the metal of the two halves between the edges is brought into registration and welded together.

2. A connecting rod for internal combustion engines formed of two pressed halves, a cross section of the rod being of substantially the shape of the figure eight, the two halves being welded continuously along their outer registering edges and intermittently at their inner registering portions.

3. A connecting rod for internal combustion engines, formed of two halves united by a strap-like portion, the metal of the strap-like portion being bent into a substantially cylindrical form surrounding the wrist pin, and a sleeve within the cylinder formed by the two halves and having its end portions lapped back over the outer surface of the ends of the cylinder to reinforce the wrist pin bearing portion of the arm and bind the two halves together.

4. A pressed metal connecting rod formed of two halves united in a plane parallel to the axis of the crank pin, each half formed with a pair of lobes extending throughout the length of the shank portion of the rod, the metal being thickened along the portion of said lobes most distant from the plane of union between the two halves.

5. A bearing retainer or cap for connecting rods comprising an inner semi-cylindrical sleeve and an outer sleeve of substantially semi-cylindrical form, the inner sleeve being lapped over the ends of the outer cylinder and formed against the outer surface thereof, the outer cylindrical member having a pair of pressed up projections at each side and a bushing secured between each pair of projections for receiving the bolt, the said projections having portions lying between said bushing and said inner sleeve.

6. A connecting rod comprising a bearing cylinder formed in two halves, in combination with means for receiving bolts for securing said halves together comprising a pair of two ply projections struck up from the metal at each side of said halves, the outer ends of the projections of each pair being curved inwardly toward each other and the inner ends of the inner plies being connected by a curved web, and bushings inserted between the said pairs of arms and having their ends flanged over the ends of said projections.

7. A connecting rod comprising a bearing cylinder formed in two halves, in combination with means for receiving bolts for securing said halves together comprising a pair of projections struck up from the metal at each side of said halves, the outer ends of the projections of each pair being curved inwardly toward each other, and bushings inserted between the said pairs of arms and having their ends flanged over the ends of said projections.

8. A connecting rod comprising a bearing cylinder formed in two halves, in combination with means for receiving bolts for securing said halves together comprising a pair of projections struck up from the metal at each side of said halves, the outer ends of the projections of each pair being curved inwardly toward each other, and bushings inserted between the said pairs of arms.

9. A connecting rod comprising a bearing cylinder formed in two halves in combination with means for receiving bolts for securing said halves together comprising a pair of projections struck up from the metal at each side of said halves, the outer ends of the projections of each pair being curved inwardly toward each other.

10. A connecting rod having one half of a bearing cylinder formed at one end thereof, the said bearing cylinder being provided at each side with means for receiving bolts comprising a pair of projections struck up from the metal, the outer ends of the projections being curved inwardly toward each other.

11. A cap for a connecting rod provided at each side with means for receiving bolts comprising a pair of projections struck up from the metal, the outer ends of the projections being curved inwardly toward each other.

12. A pressed metal connecting rod formed of two halves united in a plane parallel to the axis of the crank pin, each half formed with a pair of hollow lobes extending throughout the length of the shank portion of the rod, the metal being thickened along the portion of said lobes most distant from the plane of union between the two halves.

13. A pressed metal connecting rod having a hollow outwardly extending lobe at each side thereof, the walls of said lobes being thickened at their bights.

In witness whereof, I hereunto subscribe my name this 6th day of December, 1917.

OTTO KONIGSLOW.

Witnesses:
JOHN A. BOMMHARDT,
A. A. BEMIS.